United States Patent
Liao et al.

(10) Patent No.: US 12,365,753 B2
(45) Date of Patent: Jul. 22, 2025

(54) RUBBER RESIN MATERIAL WITH HIGH THERMAL CONDUCTIVITY AND HIGH DIELECTRIC CONSTANT AND METAL SUBSTRATE USING THE SAME

(71) Applicant: NAN YA PLASTICS CORPORATION, Taipei (TW)

(72) Inventors: Te-Chao Liao, Taipei (TW); Hung-Yi Chang, Taipei (TW); Hao-Sheng Chen, Taipei (TW); Chia-Lin Liu, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 425 days.

(21) Appl. No.: 17/975,568

(22) Filed: Oct. 27, 2022

(65) Prior Publication Data

US 2023/0406982 A1    Dec. 21, 2023

(30) Foreign Application Priority Data

Jun. 16, 2022    (TW) .................................. 111122320

(51) Int. Cl.
*C08F 236/06* (2006.01)
*B32B 15/082* (2006.01)
(Continued)

(52) U.S. Cl.
CPC .......... *C08F 236/06* (2013.01); *B32B 15/082* (2013.01); *B32B 15/20* (2013.01);
(Continued)

(58) Field of Classification Search
CPC .... C08F 236/06; C08F 212/08; C08F 212/36; C08F 222/06; B32B 15/20; B32B 15/082;
(Continued)

(56) References Cited

U.S. PATENT DOCUMENTS

| | | | |
|---|---|---|---|
| 2020/0053877 A1 | 2/2020 | Liu et al. | |
| 2020/0165446 A1* | 5/2020 | Liao | ...... C08F 257/02 |
| 2022/0030709 A1 | 1/2022 | Liao et al. | |

FOREIGN PATENT DOCUMENTS

| | | |
|---|---|---|
| CN | 113773632 A | 12/2021 |
| JP | 2008133414 A | 6/2008 |

(Continued)

OTHER PUBLICATIONS

JP2008133414A machine translation (Year: 2008).*
WO2022000629A1 machine translation (Year: 2022).*

*Primary Examiner* — Mark Eashoo
*Assistant Examiner* — Caitlin Norine Illing
(74) *Attorney, Agent, or Firm* — Li & Cai Intellectual Property Office

(57) ABSTRACT

A rubber resin material with a high thermal conductivity and a high dielectric constant and a metal substrate using the same are provided. The rubber resin material includes a rubber resin composition, at least one first inorganic filler, and at least one second inorganic filler. The rubber resin composition includes 30 wt % to 60 wt % of a liquid rubber, 10 wt % to 30 wt % of a polyphenylene ether resin, and 20 wt % to 40 wt % of a crosslinker. A molecular weight of the liquid rubber ranges from 2500 g/mol to 6000 g/mol. The at least one first inorganic filler is selected from the group consisting of aluminum oxide, boron nitride, magnesium oxide, zinc oxide, aluminum nitride, silicon carbide, and aluminum silicate. The at least one second inorganic filler is selected from the group consisting of silica, strontium titanate, calcium titanate, and titanium dioxide.

11 Claims, 1 Drawing Sheet

(51) Int. Cl.
  *B32B 15/20* (2006.01)
  *C08F 212/08* (2006.01)
  *C08F 212/36* (2006.01)
  *C08F 222/06* (2006.01)
  *C08G 65/48* (2006.01)
  *C08K 3/22* (2006.01)
  *C08K 3/36* (2006.01)
  *C08K 3/38* (2006.01)
  *C08K 5/5425* (2006.01)
  *C08K 9/04* (2006.01)

(52) U.S. Cl.
  CPC .......... *C08F 212/08* (2013.01); *C08F 212/36* (2013.01); *C08F 222/06* (2013.01); *C08G 65/485* (2013.01); *C08K 3/22* (2013.01); *C08K 3/36* (2013.01); *C08K 3/38* (2013.01); *C08K 5/5425* (2013.01); *C08K 9/04* (2013.01); *B32B 2250/02* (2013.01); *B32B 2250/03* (2013.01); *B32B 2250/40* (2013.01); *B32B 2307/204* (2013.01); *B32B 2307/302* (2013.01); *B32B 2311/12* (2013.01); *C08F 2810/40* (2013.01); *C08K 2003/2227* (2013.01); *C08K 2003/2241* (2013.01); *C08K 2003/385* (2013.01); *C08K 2201/001* (2013.01)

(58) Field of Classification Search
  CPC . B32B 15/06; B32B 2250/03; B32B 2250/02; B32B 2250/40; B32B 2307/302; B32B 2311/12; C08G 65/485; C08K 3/22; C08K 3/36; C08K 3/38; C08K 5/5425; C08K 9/04; C08K 2003/2227; C08K 2003/2241; C08K 2003/385; C08K 2201/001
  See application file for complete search history.

(56) References Cited

FOREIGN PATENT DOCUMENTS

| | | |
|---|---|---|
| JP | 201812772 A | 1/2018 |
| JP | 202211017 A | 1/2022 |
| JP | 2022508173 A | 1/2022 |
| JP | 202222090 A | 2/2022 |
| TW | 202009949 A | 3/2020 |
| WO | WO-2022000629 A1 * | 1/2022 ............. B32B 15/14 |

* cited by examiner

RUBBER RESIN MATERIAL WITH HIGH THERMAL CONDUCTIVITY AND HIGH DIELECTRIC CONSTANT AND METAL SUBSTRATE USING THE SAME

CROSS-REFERENCE TO RELATED PATENT APPLICATION

This application claims the benefit of priority to Taiwan Patent Application No. 111122320, filed on Jun. 16, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a rubber resin material and applications thereof, and more particularly to a rubber resin material with a high thermal conductivity and a high dielectric constant and a metal substrate using the same.

BACKGROUND OF THE DISCLOSURE

With the advancement of the fifth generation wireless system (5G wireless system), high frequency transmission has undoubtedly become the main development trend in an attempt to meet requirements of the 5G wireless system. Accordingly, relevant industries have strived to develop a high frequency substrate material for high frequency transmission (e.g., a frequency ranging from 6 GHz to 77 GHz), such that a high frequency substrate can be applied to a base station antenna, a satellite radar, an automotive radar, a wireless communication antenna, or a power amplifier.

In order to achieve the function of high frequency transmission, the high frequency substrate usually has a high dielectric constant (Dk) and a high dielectric dissipation factor (Df) Hereinafter, the dielectric constant and the dielectric dissipation factor are collectively referred to as dielectric properties of the high frequency substrate.

A rubber resin material that is currently available on the market usually contains a certain amount of a liquid rubber. The liquid rubber has both a high solubility and a reactive functional group, so that the rubber resin material can be used as the high frequency substrate material. However, the liquid rubber cannot be added without limit. If an amount of the liquid rubber is higher than 25 wt %, a glass transition temperature (Tg) of the rubber resin material becomes lower, and a peeling strength of a substrate made from the low-dielectric rubber resin material becomes weaker.

In addition, the rubber resin material also contains a certain amount of thermal conductive fillers to increase a thermal conductivity thereof. Relative to 100 phr of a resin material, an amount of the thermal conductive fillers ranges from a value larger than 45 phr to 60 phr. However, an excessive amount of the thermal conductive fillers can negatively influence a compatibility between the resin material and the thermal conductive fillers. As a result, a heat resistance of the substrate is decreased and the rubber resin material is not suitable to be applied to the high frequency substrate material.

SUMMARY OF THE DISCLOSURE

In response to the above-referenced technical inadequacies, the present disclosure provides a rubber resin material with a high thermal conductivity and a high dielectric constant and a metal substrate using the same.

In one aspect, the present disclosure provides a rubber resin material with a high thermal conductivity and a high dielectric constant, which includes a rubber resin composition, at least one first inorganic filler, and at least one second inorganic filler. The rubber resin composition includes 30 wt % to 60 wt % of a liquid rubber, 10 wt % to 30 wt % of a polyphenylene ether resin, and wt % to 40 wt % of a crosslinker. A molecular weight of the liquid rubber ranges from 2500 g/mol to 6000 g/mol. The at least one first inorganic filler is selected from the group consisting of aluminum oxide, boron nitride, magnesium oxide, zinc oxide, aluminum nitride, silicon carbide, and aluminum silicate. The at least one second inorganic filler is selected from the group consisting of silica, strontium titanate, calcium titanate, and titanium dioxide.

In one embodiment of the present disclosure, the liquid rubber is formed from at least one monomer of a styrene monomer, a butadiene monomer, a divinylbenzene monomer, and a maleic anhydride monomer.

In one embodiment of the present disclosure, the liquid rubber contains 30 mol % to 90 mol % of a vinyl end group and 10 mol % to 50 mol % of a styrene end group based on total end groups thereof.

In one embodiment of the present disclosure, based on a total weight of the butadiene monomer being 100 wt %, 30 wt % to 90 wt % of the butadiene monomer have a vinyl-containing side chain.

In one embodiment of the present disclosure, the at least one first inorganic filler is surface-treated to have at least one of an acrylic group and a vinyl group.

In one embodiment of the present disclosure, relative to 100 phr of the rubber resin composition, an amount of the at least one first inorganic filler ranges from 100 phr to 150 phr, and an amount of the at least one second inorganic filler ranges from 20 phr to 250 phr.

In one embodiment of the present disclosure, relative to 100 phr of the rubber resin composition, the at least one first inorganic filler includes 5 phr to 120 phr of the aluminum oxide, 10 phr to 100 phr of the boron nitride, and 30 phr to 80 phr of the aluminum silicate, and the at least one second inorganic filler includes 20 phr to 50 phr of at least one of the titanium dioxide, the strontium titanate, and the calcium titanate and 10 phr to 40 phr of the silica.

In one embodiment of the present disclosure, the rubber resin material further includes a siloxane coupling agent that has at least one of an acryl group and a vinyl group.

In one embodiment of the present disclosure, relative to 100 phr of the rubber resin composition, an amount of the siloxane coupling agent ranges from phr to 5 phr.

In another aspect, the present disclosure provides a metal substrate that includes a substrate layer and a metal layer disposed on the substrate layer, and a material of the substrate layer includes the rubber resin material with a high thermal conductivity and a high dielectric constant that has the above-mentioned composition.

In one embodiment of the present disclosure, a thermal conductivity of the metal substrate is higher than or equal to 1.2 W/m·K.

In one embodiment of the present disclosure, a dielectric constant of the metal substrate ranges from 6 to 12.

In one embodiment of the present disclosure, a peeling strength of the metal substrate ranges from 4.5 lb/in to 7.0 lb/in.

Therefore, in the rubber resin material with a high thermal conductivity and a high dielectric constant and the metal substrate provided by the present disclosure, by virtue of the rubber resin composition including 30 wt % to 60 wt % of a liquid rubber having a molecular weight from 2500 g/mol to 6000 g/mol, the at least one first inorganic filler selected from the group consisting of aluminum oxide, boron nitride, magnesium oxide, zinc oxide, aluminum nitride, silicon carbide, and aluminum silicate, and the at least one second inorganic filler selected from the group consisting of silica, strontium titanate, calcium titanate, and titanium dioxide, requisite physical properties such as a thermal conductivity, dielectric properties, a peeling strength, and a heat resistance, can be achieved in practical applications.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
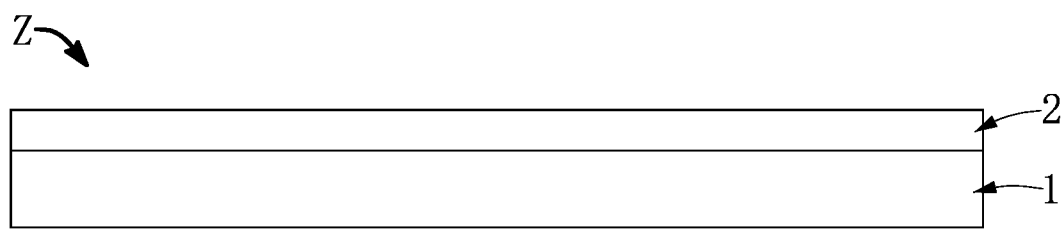
FIG. 1 is a schematic view of a metal substrate of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Rubber Resin Material with High Thermal Conductivity and High Dielectric Constant The present disclosure provides a rubber resin material with a high thermal conductivity and a high dielectric constant, in which two different kinds of inorganic fillers are introduced into a rubber resin system. Accordingly, the physical properties of the rubber resin system including a thermal conductivity and dielectric properties can meet requirements of high frequency and high speed applications. Therefore, the rubber resin material of the present disclosure is more suitable to be used as a high-frequency high-speed substrate material than materials conventionally used for the same.

More specifically, the rubber resin material of the present disclosure includes a rubber resin composition, at least one first inorganic filler (i.e., one or more high thermal conductive inorganic fillers), and at least one second inorganic filler (i.e., one or more high-dielectric inorganic fillers). The at least one first inorganic filler and the at least one second inorganic filler are uniformly dispersed in the rubber resin composition. The following description will illustrate the rubber resin composition, the at least one first inorganic filler, and the at least one second inorganic filler in greater detail.

Rubber Resin Composition

In the present disclosure, the rubber resin composition mainly includes: 30 wt % to 60 wt % of a liquid rubber, 10 wt % to 30 wt % of a polyphenylene ether resin, and 20 wt % to 40 wt % of a crosslinker.

It is worth mentioning that, when a molecular weight of the liquid rubber ranges from 2500 g/mol to 6000 g/mol, the rubber resin composition has an increased flowability, such that the gap filling ability of the rubber resin material of the present disclosure can be improved. The molecular weight of the liquid rubber preferably ranges from 3000 g/mol to 5500 g/mol, and more preferably ranges from 3000 g/mol to 5000 g/mol. The liquid rubber has a high solubility, which can increase a compatibility between components of the rubber resin composition. Furthermore, the liquid rubber contains reactive functional groups, which can increase a degree of crosslinking of the rubber resin material after being cured.

In addition, the liquid rubber has a specific molecular weight and molecular structure and is derived from specific monomers. Therefore, a greater amount of the liquid rubber can be added to the rubber resin composition, i.e., an amount of the liquid rubber in the rubber resin composition can be greatly increased. More specifically, based on a total weight of the rubber resin composition being 100 wt %, the amount of the liquid rubber can be higher than 40 wt %, and is significantly higher than an amount of a liquid rubber in a rubber resin composition in the related art, which is about 25 wt %. Preferably, the amount of the liquid rubber in the rubber resin composition ranges from 30 wt % to 60 wt %.

In certain embodiments, the liquid rubber includes a liquid diene rubber. Specifically, the liquid diene rubber includes a polybutadiene resin. The polybutadiene resin is a polymer polymerized from a butadiene monomer, such as a butadiene homopolymer or a copolymer formed from butadiene and other monomers.

In certain embodiments, the liquid diene rubber is a copolymer formed from butadiene and styrene. In other words, monomers forming the liquid rubber include styrene and arranged butadiene monomers. The styrene and butadiene monomers can randomly form a random copolymer, or can be regularly arranged to form an alternating copolymer or a block copolymer.

Based on a total weight of the liquid rubber being 100 wt %, an amount of the styrene monomer ranges from 10 wt % to 50 wt %. When the amount of the styrene monomer in the liquid rubber ranges from 10 wt % to 50 wt %, the liquid rubber can have a molecular geometric structure similar to an arrangement of liquid crystals, thereby increasing a heat resistance and a system compatibility. Preferably, the amount of the styrene monomer in the liquid rubber ranges from 15 wt % to 50 wt % of the styrene monomer. If the amount of the styrene monomer is higher than 50 wt %, the rubber resin material may have a higher viscosity that is disadvantageous for manufacturing a metal substrate with high thermal conductivity.

Specifically, the butadiene monomer has two double bonds. Thus, different ways of polymerizing the butadiene monomer can result in different structures of the polybutadiene resin. In other words, the polybutadiene resin can include one or more structures of: cis-1,4-polybutadiene, trans-1,4-polybutadiene, and 1,2-polybutadiene. More specifically, when the butadiene monomer is polymerized through a 1,4-addition reaction, the structure of cis-1,4-polybutadiene or trans-1,4-polybutadiene containing no unsaturated side chains is formed. When the butadiene monomer is polymerized through a 1,2-addition reaction, the structure of 1,2-polybutadiene containing an unsaturated side chain (e.g., a vinyl group) is formed.

Preferably, based on a total weight of the butadiene monomer being 100 wt %, 30 wt % to 90 wt % of the butadiene monomer after polymerization have a vinyl-containing side chain. Preferably, based on the total weight of the butadiene monomer being 100 wt %, 30 wt % to 80 wt % of the butadiene monomer after polymerization have a vinyl-containing side chain.

When the liquid rubber contains at least one vinyl-containing unsaturated side chain (or a vinyl group), the crosslinking density and the heat resistance of the rubber resin composition after being crosslinked can be increased. In the present disclosure, an amount of the at least one vinyl-containing unsaturated side chain (or a vinyl group) in the liquid rubber can be quantified by an iodine value in a chemical analysis.

The higher the amount of the at least one vinyl-containing unsaturated side chain (or a vinyl group) in the liquid rubber is, the higher the iodine value of the liquid rubber is. The rubber resin composition after being crosslinked can have increased physical properties by the at least one vinyl-containing unsaturated side chain (or a vinyl group). In the present disclosure, the iodine value of the liquid rubber ranges from 30 g/100 g to 60 g/100 g.

In an exemplary method for measurement of the iodine value of the liquid rubber, 0.3 mg to 1 mg of the liquid rubber is completely dissolved in chloroform, and is placed in the dark for 30 minutes after a Wijs solution is added thereinto. Next, 20 ml of a potassium iodide solution (100 g/L) and 100 ml of water are added to form an analyte. Afterwards, the analyte is titrated by a sodium thiosulfate solution (0.1 mol/L). When a color of the analyte becomes light yellow, a few drops of a starch solution (10 g/L) are dripped into the analyte. Then, the analyte is further titrated until the blue color of the analyte fades completely away.

In certain embodiments, the liquid diene rubber is a copolymer formed from styrene, butadiene, divinylbenzene, and maleic anhydride monomers. In other words, the monomers forming the liquid rubber include styrene, butadiene, divinylbenzene, and maleic anhydride monomers. The styrene, butadiene, divinylbenzene, and maleic anhydride monomers can be in a regular or random arrangement. Based on a total weight of the styrene, butadiene, divinylbenzene, and maleic anhydride monomers being 100 mol %, an amount of the butadiene monomer ranges from 30 mol % to 90 mol %, an amount of the styrene monomer ranges from 10 mol % to 50 mol %, an amount of the divinylbenzene monomer ranges from 10 mol % to 40 mol %, and an amount of the maleic anhydride monomer ranges from 2 mol % to 20 mol %. In the liquid diene rubber, the divinylbenzene monomer and the maleic anhydride monomer can improve peeling strength and heat resistance.

A molecular weight of the polyphenylene ether resin ranges from 1000 g/mol to 20000 g/mol. Preferably, the molecular weight of the polyphenylene ether resin ranges from 2000 g/mol to 10000 g/mol. More preferably, the molecular weight of the polyphenylene ether resin ranges from 2000 g/mol to 2200 g/mol. It should be noted that, the polyphenylene ether resin has a better solvent solubility when a molecular weight thereof is lower than 20000 g/mol, which is advantageous for preparing the rubber resin composition.

Preferably, the polyphenylene ether resin can have at least one modifying group. The at least one modifying group can be selected from the group consisting of: a hydroxyl group, an amino group, a vinyl group, a styrene group, a methacrylate group, and an epoxy group. The at least one modifying group of the polyphenylene ether resin can provide one or more unsaturated bonds to facilitate a crosslinking reaction. Accordingly, a material having a high glass transition temperature and a good heat resistance can be obtained. In the present embodiment, two opposite ends of the molecular structure of the polyphenylene ether resin each have a modifying group, and the two modifying groups are the same.

Preferably, the polyphenylene ether resin can include one kind of polyphenylene ether or various kinds of polyphenylene ether.

For example, the polyethylene ether can be a product under the name of SA90 (i.e., a polyphenylene ether that has two hydroxyl modifying groups at molecular ends thereof) or SA9000 (i.e., a polyphenylene ether that has two methacrylate modifying groups at molecular ends thereof) available from SABIC Innovative Plastics or a product under the name of OPE-2st (i.e., a polyphenylene ether that has two styrene modifying groups at molecular ends thereof), OPE-2EA (i.e., a polyphenylene ether that has two methacrylate modifying groups at molecular ends thereof), or OPE-2Gly (i.e., a polyphenylene ether that has two epoxy modifying groups at molecular ends thereof) available from Mitsubishi Gas Chemical Company, Inc. However, the present disclosure is not limited thereto.

For example, the polyethylene ether can be a polyphenylene ether that has two hydroxyl modifying groups at molecular ends thereof, a polyphenylene ether that has two methacrylate modifying groups at molecular ends thereof, a polyphenylene ether that has two styrene modifying groups at molecular ends thereof, or a polyphenylene ether that has two epoxy modifying groups at molecular ends thereof. However, the present disclosure is not limited thereto.

In certain embodiments, the polyphenylene ether resin can include a first polyphenylene ether and a second polyphenylene ether. Molecular ends of both the first polyphenylene ether and the second polyphenylene ether each have at least one modifying group. The at least one modifying group can be selected from the group consisting of: a hydroxyl group, an amino group, a vinyl group, a styrene group, a methacrylate group, and an epoxy group. In addition, the at least one modifying group of the first polyphenylene ether and the at least one modifying group of the second polyphenylene ether can be different from each other. Specifically, a weight ratio of the first polyphenylene ether to the second polyphenylene ether ranges from 0.5 to 1.5. Preferably, the weight ratio of the first polyphenylene ether to the second polyphenylene ether ranges from 0.75 to 1.25. More preferably, the weight ratio of the first polyphenylene ether to the second polyphenylene ether is 1.

For example, the first polyphenylene ether and the second polyphenylene can each be independently a polyphenylene ether that has two hydroxyl modifying groups at molecular ends thereof, a polyphenylene ether that has two methacrylate modifying groups at molecular ends thereof, a polyphenylene ether that has two styrene modifying groups at molecular ends thereof, or a polyphenylene ether that has two epoxy modifying groups at molecular ends thereof. However, the present disclosure is not limited thereto.

For example, the first polyphenylene ether and the second polyphenylene can each be independently a product under the name of SA90 (i.e., a polyphenylene ether that has two hydroxyl modifying groups at molecular ends thereof) or SA9000 (i.e., a polyphenylene ether that has two methacrylate modifying groups at molecular ends thereof) available from SABIC Innovative Plastics or a product under the name of OPE-2st (i.e., a polyphenylene ether that has two styrene modifying groups at molecular ends thereof), OPE-2EA (i.e., a polyphenylene ether that has two methacrylate modifying groups at molecular ends thereof), or OPE-2Gly (i.e., a polyphenylene ether that has two epoxy modifying groups at molecular ends thereof) available from Mitsubishi Gas Chemical Company, Inc. However, the present disclosure is not limited thereto.

The crosslinker of the present disclosure can increase a crosslinking degree of the polyphenylene ether resin and the liquid rubber. In the present embodiment, the crosslinker can include an allyl group. For example, the crosslinker can be triallyl cyanurate (TAC), triallyl isocyanurate (TRIC), diallyl phthalate, divinylbenzene, triallyl trimellitate, or any combination thereof. Preferably, the crosslinker can be triallyl isocyanurate. However, the present disclosure is not limited thereto.

First Inorganic Filler

The at least one first inorganic filler can be added to reduce the viscosity of the rubber resin material and increase the thermal conductivity of the rubber resin material. The above description provides an overview of the effects of the at least one first inorganic filler, and is not intended to limit the scope of the present disclosure. In practice, the at least one first inorganic filler may also improve the dielectric properties of the rubber resin material.

In the present disclosure, the at least one first inorganic filler can be selected from the group consisting of aluminum oxide, boron nitride, magnesium oxide, zinc oxide, aluminum nitride, silicon carbide, and aluminum silicate. However, such examples are not intended to limit the present disclosure. In a preferable embodiment, the at least one first inorganic filler includes at least one of the aluminum oxide and the boron nitride.

The at least one first inorganic filler can be surface-treated to have an acrylic group and/or a vinyl group, i.e., have at least one of an acrylic group and a vinyl group. Accordingly, the at least one first inorganic filler is able to react with the liquid rubber, such that the rubber resin composition has good compatibility without negatively influencing a heat resistance of a metal substrate with a high thermal conductivity. Furthermore, the at least one first inorganic filler can be added in a greater amount to the rubber resin material, which is higher than an upper limit for addition of at least one inorganic filler of the related art. Therefore, the rubber resin material of the present disclosure is more suitable to be used as a high frequency substrate material.

It should be noted that, the at least one first inorganic filler can be formed from a single inorganic powder or a mixture of different inorganic powders and by full or partial surface-treatment. In a specific example of the at least one first inorganic filler that includes aluminum oxide and boron nitride, the aluminum oxide is surface-modified to have an acrylic group and/or a vinyl group and the boron nitride is not surface-modified. The above description is for exemplary purposes only and is not intended to limit the scope of the present disclosure.

In a preferable embodiment, the at least one first inorganic filler includes aluminum oxide, boron nitride, and aluminum silicate. Relative to 100 phr of the rubber resin composition, an amount of the aluminum oxide ranges from 50 phr to 120 phr, an amount of the boron nitride ranges from 10 phr to 100 phr, and an amount of the aluminum silicate ranges from 30 phr to 80 phr.

Specifically, a surface modifying method includes impregnating the at least one first inorganic filler with a silane having a specific functional group (e.g., a silane having an acrylic group or a vinyl group). Accordingly, the at least one first inorganic filler can have at least one of an acrylic group and a vinyl group.

An amount of the at least one first inorganic filler can be adjusted according to product requirements. In certain embodiments, based on the total weight of the rubber resin composition being 100 phr, the amount of the at least one first inorganic filler ranges from 100 phr to 150 phr. Preferably, based on the total weight of the rubber resin composition being 100 phr, the amount of the at least one first inorganic filler ranges from 110 phr to 140 phr. More preferably, based on the total weight of the rubber resin composition being 100 phr, the amount of the at least one first inorganic filler ranges from 120 phr to 130 phr. The above description is for exemplary purposes only and is not intended to limit the scope of the present disclosure.

An appearance of the at least one first inorganic filler can be granular or flaky, and is preferably flaky. An average particle size of the at least one first inorganic filler ranges from 0.3 μm to 3 μm. Preferably, the average particle size of the at least one first inorganic filler ranges from 0.3 μm and 0.6 μm. Accordingly, the at least one first inorganic filler can be uniformly dispersed in the rubber resin composition.

Second Inorganic Filler

The at least one second inorganic filler can be added to reduce the viscosity and dielectric constant of the rubber resin material. The above description provides an overview of the effects of the at least one second inorganic filler, and is not intended to limit the scope of the present disclosure. In practice, the addition of the at least one second inorganic filler may also improve the thermal conductivity of the rubber resin material.

In the present disclosure, the at least one second inorganic filler is selected from the group consisting of silica, strontium titanate, calcium titanate, and titanium dioxide. However, such examples are not intended to limit the present disclosure. In a preferable embodiment, the at least one second inorganic filler includes both the silica and the titanium dioxide, in which at least one of the strontium titanate and the calcium titanate can be used in place of the titanium dioxide. The silica can be fused silica or crystalline silica, and is preferably fused silica.

In a preferable embodiment, the at least one second inorganic filler can be surface-treated to have an acrylic group and/or a vinyl group, i.e., have at least one of an acrylic group and a vinyl group. Accordingly, the at least one second inorganic filler is able to react with the liquid rubber, such that the rubber resin composition has good compatibility without negatively influencing a heat resistance of a metal substrate with a high dielectric constant. Furthermore, the at least one second inorganic filler can be added in a greater amount to the rubber resin material, which is higher than an upper limit for addition of at least one inorganic filler in the related art. Therefore, the rubber resin material of the present disclosure is more suitable to be used as a high frequency substrate material.

It should be noted that, the at least one second inorganic filler can be formed from a single inorganic powder or a mixture of different inorganic powders and by full or partial surface-treatment. In a specific example of the at least one second inorganic filler that includes silica, one portion of the silica is surface-modified to have an acrylic group and/or a vinyl group, and another one portion of the silica is not surface-modified. The above description is for exemplary purposes only and is not intended to limit the scope of the present disclosure.

Specifically, a surface modifying method includes impregnating the at least one second inorganic filler with a silane having a specific functional group (e.g., a silane having an acrylic group or a vinyl group). Accordingly, the at least one second inorganic filler can have at least one of an acrylic group and a vinyl group.

An amount of the at least one second inorganic filler can be adjusted according to product requirements. In certain embodiments, based on the total weight of the rubber resin composition being 100 phr, the amount of the at least one second inorganic filler ranges from 20 phr to 250 phr. Preferably, based on the total weight of the rubber resin composition being 100 phr, the amount of the at least one second inorganic filler ranges from 30 phr to 200 phr. More preferably, based on the total weight of the rubber resin composition being 100 phr, the amount of the at least one second inorganic filler ranges from 40 phr to 160 phr. The above description is for exemplary purposes only and is not intended to limit the scope of the present disclosure.

In a preferable embodiment, based on the total weight of the rubber resin composition being 100 phr, the at least one second inorganic filler includes 20 phr to 50 phr of at least one of the titanium dioxide, the strontium titanate, and the calcium titanate and 10 phr to 40 phr of the silica.

An appearance of the at least one second inorganic filler can be spherical, and an average particle size of the at least one second inorganic filler ranges from 0.3 μm to 3 μm. Accordingly, the at least one second inorganic filler can be uniformly dispersed in the rubber resin composition.

Siloxane Coupling Agent

The rubber resin material of the present disclosure can further include a siloxane coupling agent that is added to increase a reactivity and a compatibility between a fiber cloth, a rubber resin composition and inorganic fillers (e.g., the at least one first inorganic filler and the at least one second inorganic filler), thereby increasing a peeling strength and a heat resistance of a metal substrate.

In a preferable embodiment, the siloxane coupling agent has at least one of an acryl group and a vinyl group. A molecular weight of the siloxane coupling agent ranges from 100 g/mol to 500 g/mol. Preferably, the molecular weight of the siloxane coupling agent ranges from 110 g/mol to 250 g/mol. More preferably, the molecular weight of the siloxane coupling agent ranges from 120 g/mol to 200 g/mol.

Relative to 100 phr of the rubber resin composition, an amount of the siloxane coupling agent ranges from 0.1 phr to 5 phr. Preferably, relative to 100 phr of the rubber resin composition, the amount of the siloxane coupling agent ranges from 0.5 phr to 3 phr.

Flame Retardant

The rubber resin material of the present disclosure can further include a flame retardant that is added to increase a flame retardant property of a high frequency substrate. For example, the flame retardant can be a phosphorus flame retardant or a brominated flame retardant. Preferably, the flame retardant is a halogen-free flame retardant, i.e., the flame retardant does not contain halogen.

The brominated flame retardant can be ethylene bistetrabromophthalimide, tetradecabromodiphenoxy benzene, decabromo diphenoxy oxide, or any combination thereof, but is not limited thereto.

The phosphorus flame retardant can be sulphosuccinic acid ester, phosphazene, ammonium polyphosphate, melamine polyphosphate, or melamine cyanurate. Examples of the sulphosuccinic acid ester include triphenyl phosphate (TPP), tetraphenyl resorcinol bis(diphenylphosphate) (RDP), bisphenol A bis(diphenyl phosphate) (BPAPP), bisphenol A bis(dimethyl phosphate) (BBC), resorcinol diphosphate (e.g., the product under the name of CR-733S produced by Daihachi Chemical Industry Co., Ltd.), and resorcinol-bis(di-2,6-dimethylphenyl phosphate) (e.g., the product under the name of PX-200 produced by Daihachi Chemical Industry Co., Ltd.). However, such examples are not intended to limit the present disclosure.

An amount of the flame retardant can be adjusted according to product requirements. In certain embodiments, relative to 100 phr of the rubber resin composition, the amount of the flame retardant ranges from 0.1 phr to 5 phr.

Metal Substrate

Figure 2:
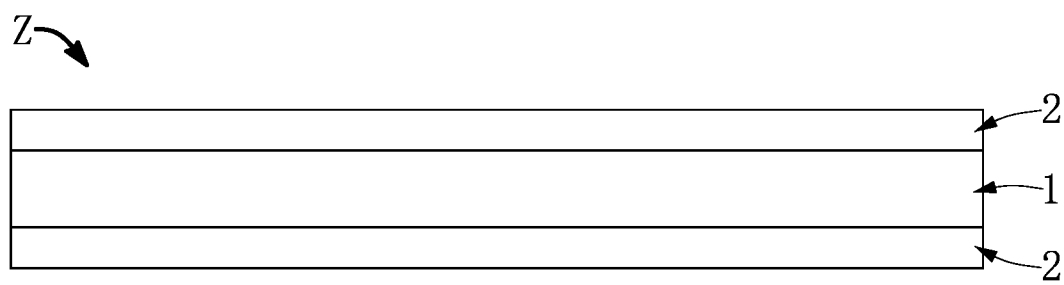
FIG. 2 is another schematic view of the metal substrate of the present disclosure.

Referring to FIG. 1 and FIG. 2, the present disclosure provides a metal substrate Z that includes a substrate layer 1 and at least one metal layer 2 disposed on the substrate layer 1. A material of the substrate layer 1 includes the rubber resin material with a high thermal conductivity and a high dielectric constant that has the above-mentioned composition. Specifically, the metal substrate Z can be a copper clad laminate (CCL), and can include only one metal layer 2 (e.g., a copper foil layer) formed on a surface (e.g., an upper surface) of the substrate layer 1. Alternatively, the metal substrate Z can include two metal layers 2 respectively formed on two opposite surfaces (e.g., upper and lower surfaces) of the substrate layer 1.

More specifically, a dielectric constant of the metal substrate Z at 10 GHz ranges from 6 to 12. A dielectric dissipation factor of the metal substrate Z at 10 GHz is lower than 0.0040, preferably lower than 0.0035, and more preferably lower than 0.0030. A thermal conductivity of the metal substrate Z is higher than or equal to 1.2 W/m·K, preferably 1.3 W/m·K, and more preferably 1.4 W/m·K. A peeling strength of the metal substrate Z ranges from 4.5 lb/in to 7.0 lb/in, and preferably ranges from 5 lb/in to 7.0 lb/in.

The properties of the metal substrate Z are measured by the following methods.
(1) Dielectric constant (10 GHz): detecting the dielectric constant of the metal substrate at 10 GHz by a dielectric analyzer (model: HP Agilent E5071C).
(2) Dissipation factor (10 GHz): detecting the dielectric dissipation factor of the metal substrate at 10 GHz by the dielectric analyzer (model: HP Agilent E5071C).
(3) Peeling strength: measuring the peeling strength of the metal substrate according to the IPC-TM-650-2.4.8 test method.
(4) Thermal conductivity: measuring a thermal conductivity of the metal substrate according to the ASTM D5470 test method.

Beneficial Effects of the Embodiments

In conclusion, in the rubber resin material with a high thermal conductivity and a high dielectric constant and the metal substrate provided by the present disclosure, by virtue of the rubber resin composition including 30 wt % to 60 wt % of a liquid rubber having a molecular weight from 2500 g/mol to 6000 g/mol, the at least one first inorganic filler selected from the group consisting of aluminum oxide, boron nitride, magnesium oxide, zinc oxide, aluminum nitride, silicon carbide, and aluminum silicate, and the at least one second inorganic filler selected from the group consisting of silica, strontium titanate, calcium titanate, and titanium dioxide, requisite physical properties such as a thermal conductivity, dielectric properties, a peeling strength, and a heat resistance, can be achieved in practical applications.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A rubber resin material with a high thermal conductivity and a high dielectric constant, comprising a rubber resin composition, at least one first inorganic filler, and at least one second inorganic filler, wherein the rubber resin composition includes:
   30 wt % to 60 wt % of a liquid rubber, a molecular weight of the liquid rubber ranging from 2500 g/mol to 6000 g/mol;
   10 wt % to 30 wt % of a polyphenylene ether resin; and
   20 wt % to 40 wt % of a crosslinker;
   wherein relative to 100 phr of the rubber resin composition, the at least one first inorganic filler includes 5 phr to 120 phr of aluminum oxide, 10 phr to 100 phr of boron nitride, and 30 phr to 80 phr of aluminum silicate, and the at least one second inorganic filler includes 20 phr to 50 phr of at least one of titanium dioxide, strontium titanate, and calcium titanate and 10 phr to 40 phr of silica.

2. The rubber resin material according to claim 1, wherein the liquid rubber is formed from at least one monomer selected from the group consisting of a styrene monomer, a butadiene monomer, a divinylbenzene monomer, and a maleic anhydride monomer.

3. The rubber resin material according to claim 2, wherein the liquid rubber contains 30 mol % to 90 mol % of a vinyl end group and 10 mol % to 50 mol % of a styrene end group based on total end groups thereof.

4. The rubber resin material according to claim 2, wherein based on a total weight of the butadiene monomer being 100 wt %, 30 wt % to 90 wt % of the butadiene monomer have a vinyl-containing side chain.

5. The rubber resin material according to claim 1, wherein the at least one first inorganic filler is surface-treated to have at least one of an acrylic group or a vinyl group.

6. The rubber resin material according to claim 1, further comprising a siloxane coupling agent that has at least one of an acryl group or a vinyl group.

7. The rubber resin material according to claim 6, wherein relative to 100 phr of the rubber resin composition, an amount of the siloxane coupling agent ranges from 0.1 phr to 5 phr.

8. A metal substrate comprising a substrate layer and a metal layer disposed on the substrate layer, wherein a material of the substrate layer includes the rubber resin material as claimed in claim 1.

9. The metal substrate according to claim 8, wherein a thermal conductivity of the metal substrate is higher than or equal to 1.2 W/m·K.

10. The metal substrate according to claim 8, wherein a dielectric constant of the metal substrate ranges from 6 to 12.

11. The metal substrate according to claim 8, wherein a peeling strength of the metal substrate ranges from 4.5 lb/in to 7.0 lb/in.

* * * * *